(12) United States Patent
Weber et al.

(10) Patent No.: US 7,891,096 B2
(45) Date of Patent: Feb. 22, 2011

(54) METHOD FOR REINFORCING A FOAM MATERIAL AS WELL AS A SANDWICH COMPONENT

(75) Inventors: Hans-Jürgen Weber, Verden (DE); Gregor Christian Endres, Pfaffenhofen (DE)

(73) Assignee: Airbus Deutschland GmbH, Hamburg (DE)

( * ) Notice: Subject to any disclaimer, the term of this patent is extended or adjusted under 35 U.S.C. 154(b) by 295 days.

(21) Appl. No.: 12/009,826

(22) Filed: Jan. 22, 2008

(65) Prior Publication Data

US 2008/0176024 A1    Jul. 24, 2008

Related U.S. Application Data

(60) Provisional application No. 60/881,980, filed on Jan. 23, 2007.

(51) Int. Cl.
*B21D 53/88* (2006.01)
(52) U.S. Cl. ............... 29/897.2; 29/897; 29/897.1; 264/46.5; 428/99; 428/306.6
(58) Field of Classification Search ............ 29/897, 29/897.1, 897.2; 428/99, 4, 306.6; 264/236, 264/263, 261, 46.5; 411/82
See application file for complete search history.

(56) References Cited

U.S. PATENT DOCUMENTS

| | | | | |
|---|---|---|---|---|
| 3,344,370 A | * | 9/1967 | Sewell | 333/244 |
| 4,370,372 A | * | 1/1983 | Higgins et al. | 428/116 |
| 4,819,980 A | * | 4/1989 | Sakata et al. | 296/35.1 |
| 5,106,666 A | * | 4/1992 | Fitzgerald et al. | 428/67 |
| 5,791,047 A | * | 8/1998 | Skalka | 29/897.34 |
| 6,076,246 A | * | 6/2000 | McCooey | 29/469.5 |
| 6,385,935 B2 | * | 5/2002 | Lippy | 52/512 |
| 6,394,537 B1 | * | 5/2002 | DeRees | 296/191 |
| 6,713,008 B1 | * | 3/2004 | Teeter | 264/258 |
| 6,770,349 B2 | * | 8/2004 | Itoh et al. | 428/73 |
| 6,896,321 B2 | * | 5/2005 | Vishey et al. | 296/214 |
| 7,069,830 B1 | * | 7/2006 | Meyer | 83/13 |

(Continued)

FOREIGN PATENT DOCUMENTS

DE    10 2005 024408    11/2006

(Continued)

OTHER PUBLICATIONS

German Office Action dated Aug. 31, 2007.

*Primary Examiner*—Rick K Chang
(74) *Attorney, Agent, or Firm*—Jenkins, Wilson, Taylor & Hunt, P.A.

(57) ABSTRACT

Provided is a method for reinforcing a foam material in which a working region is first prescribed. A gap that at least partially encloses the prescribed working region in a two-dimensional manner is created in the foam material. A strut is introduced into the foam material, extending from an entry surface of the foam material from outside the working region to at least the fibrous sheet-like material. From a further aspect, a sandwich component with a core which comprises a foam material is provided. A fibrous sheet-like material arranged in the foam material at least partially encloses a working region of the sandwich component in a sheet-like manner. At least one strut is incorporated in the foam material and extends from an entry surface of the foam material from outside the working region to at least the fibrous sheet-like material.

11 Claims, 2 Drawing Sheets

U.S. PATENT DOCUMENTS

| | | | |
|---|---|---|---|
| 7,160,047 B2 * | 1/2007 | Mueller et al. | 403/283 |
| 7,249,415 B2 * | 7/2007 | Larsen et al. | 29/897.2 |
| 7,275,296 B2 * | 10/2007 | DiCesare | 29/464 |
| 7,325,288 B2 * | 2/2008 | Yang et al. | 29/455.1 |
| 7,393,577 B2 * | 7/2008 | Day et al. | 428/121 |
| 7,410,683 B2 * | 8/2008 | Curro et al. | 428/133 |

FOREIGN PATENT DOCUMENTS

GB 2131741 6/1984

* cited by examiner

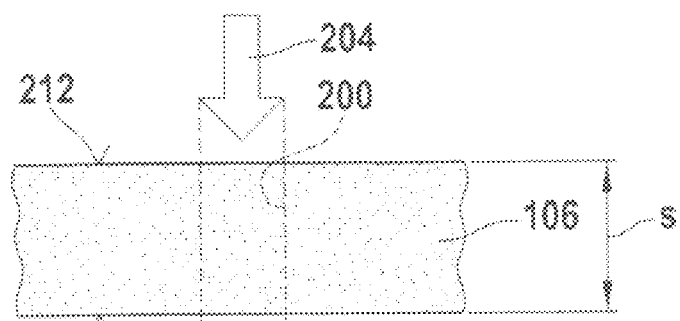
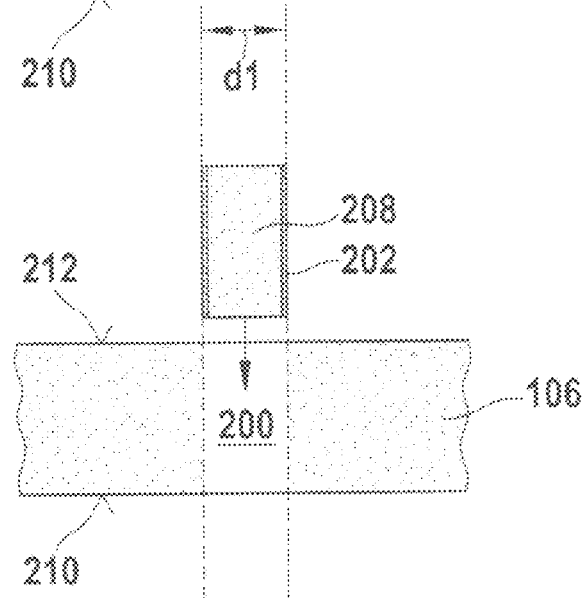
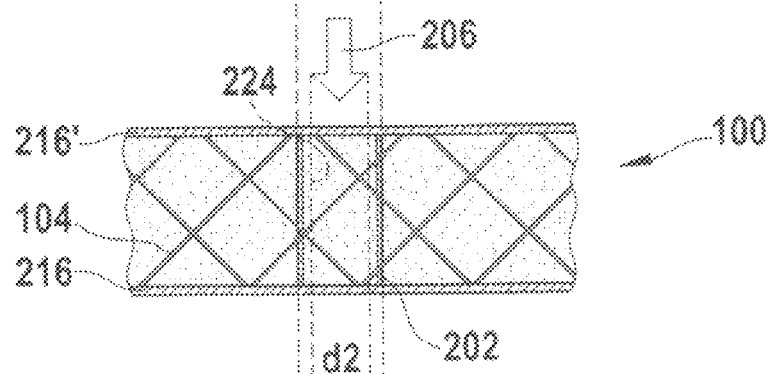
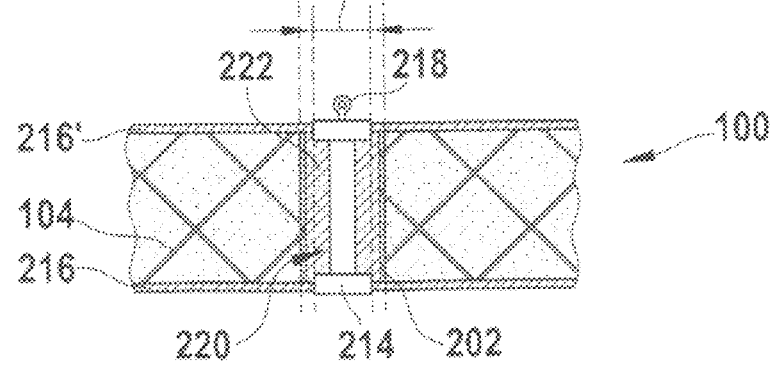

METHOD FOR REINFORCING A FOAM MATERIAL AS WELL AS A SANDWICH COMPONENT

CROSS-REFERENCE TO RELATED APPLICATIONS

This application claims the benefit of U.S. Provisional Application No. 60/881,980, filed Jan. 23, 2007, the entire disclosure of which is herein incorporated by reference.

FIELD OF THE INVENTION

The present invention relates to the technical field of composite materials. In particular, the invention relates to a method for reinforcing a foam material. The invention also relates to a sandwich component that comprises a reinforced foam material and to an aircraft with such a sandwich component or with a structural component which has been reinforced by using the method according to the invention.

BACKGROUND OF THE INVENTION

Although it can be applied to any desired reinforced foam materials, the present invention and the problems on which it is based are explained with respect to sheet-like sandwich structures with a foam core that is reinforced by fibers infiltrated with a resin, enclosed between outer layers.

in the area of aircraft construction on account of their good ratio of stiffness and strength to density. Sandwich structures generally have an upper outer layer and a lower outer layer, between which there is, for example, a core structure of vertically running cells of hexagonal cross section, to increase the stiffness.

An alternative to such honeycomb structures are rigid foams. They have advantages over honeycomb structures, inter alia in the area of thermal and acoustic insulation and in the process technology for the production of sandwich structures. One disadvantage of these foam structures is the lower mechanical strength obtained with the same density.

To compensate for this lower strength, sandwich structures with foam cores can be additionally reinforced by introducing bracing elements into the core. Sewing methods in particular offer the possibility of introducing fibers and filaments to form struts at different angles and with a density varying over the component. The technically achievable stitching speeds allow rapid reinforcement of the component to be possible. After a resin infiltration process, the pierced regions contribute to the mechanical reinforcement of the basic foam material. Such structures are already used in sandwich structures in the construction of trucks and in shipbuilding.

DE 10 2005 024 408 A1 discloses a sewing method in which a through-hole is first pierced into the foam material from one side with the needle, to then allow the needle to be used to pick up a bundle of fibers provided on the other side and draw it into the foam material. Since the bundle of fibers largely fills the through-hole, only little resin is incorporated in a subsequent infiltration, which leads to an improved ratio of the mechanical strength achieved to the density of the sandwich structure and makes corresponding structures suitable for use in aircraft construction.

The reinforcing effect is in this case based on tensile/compressive loading of the struts introduced. These can only absorb forces when they are connected at both ends to a pressure-resistant element, generally an outer layer of the sandwich structure. If they are severed in the middle or detached at one end, they are mechanically ineffectual.

Since the struts typically run at different defined angles in relation to the outer layer, there is the problem that, in the case of localized working at a working location of a sandwich structure reinforced in this way, the mechanical strength of the sandwich structure is reduced in a region that is increased beyond the worked region, in which struts lose their mechanical effect. In this increased region, the reinforced foam material becomes the strength-determining element, which has the effect that the mechanical properties greatly change locally, in particular in the case of lightweight foams.

SUMMARY OF THE INVENTION

It is therefore an object of the present invention to provide a reinforcing method which allows reinforced foam materials to be locally worked without causing any impairment of the mechanical properties in an enlarged region around the working location.

The idea on which the present invention is based is that a working region within which localized working of the foam material that is to be reinforced is later to be carried out is first prescribed.

Subsequently, a gap that at least partially encloses the prescribed working region in a two-dimensional manner, i.e. a thin, two-dimensionally extended cavity that extends in the foam material along the delimiting surfaces of the working region, is created. A fibrous sheet-like material is incorporated in this gap, so that the fibrous sheet-like material incorporated in the foam material forms the outer delimitation of the working region. In a further step, a strut is introduced into the foam material, entering the foam material at a point of the surface of the foam material that is situated outside the working region, which is to be referred to hereafter as the entry surface, and extending from there to at least the fibrous sheet-like material. A step of filling the gap penetrated by the fibrous sheet-like material with a matrix system is also provided.

As a result, the two ends of the incorporated strut connect an outer surface of the foam material, the entry surface, and the fibrous sheet-like material at the delimiting surface of the working region in the interior of the foam material. The strut is consequently connected/integrated at both ends, either of the two connecting points lying within the working region and the strut not passing the working region at any point on the connecting line between these two connecting points. If localized working of the reinforced foam, restricted to the interior of the working region, takes place at a later point in time, the connection of the strut on both sides, and consequently its reinforcing effect, are retained. As a consequence, the way in which a foam material is reinforced according to the invention makes subsequent localized working possible within the working region that is to be prescribed, without any impairment of the mechanical properties of the reinforced foam material occurring in the region extended beyond the working region.

The sandwich component according to the invention that is provided from a further aspect comprises a core, which comprises a foam material, and a fibrous sheet-like material, which is arranged in the foam material and at least partially encloses a working region of the sandwich component in a sheet-like manner. At least one strut is incorporated in the foam material and extends from an entry surface of the foam material from outside the working region to at least the fibrous sheet-like material. The sandwich component has the advantage that it can be worked in a localized manner within the working region without the mechanical properties of the sandwich component outside the working region being impaired.

Providing a step of filling the gap penetrated by the fibrous sheet-like material with a matrix system is also advantageous since, on the one hand, mechanically particularly stable delimitation of the working region is produced, so that the working region can, for example, be completely decored in the course of the localized working, without the fibrous material becoming detached from the surrounding foam material. On the other hand, integration of the strut in the resin matrix of the fibrous sheet-like material occurs, so that the structure is reliably anchored on the delimiting surface of the working region in a simple way.

According to one embodiment, the creation of the gap comprises a number of sub-steps. Firstly, the foam material within the working region is removed, for example by drilling or milling out the region. Furthermore, the embedding part is prepared, formed in a way corresponding to the working region such that it substantially fills it while leaving the gap. The embedding part is accordingly similarly formed, but a little smaller than the working region, the difference corresponding to the intended gap size. The desired gap is obtained by finally inserting the embedding part into the working region.

This embodiment is particularly advantageous since the working region can be defined by simple tools, such as a drill. Furthermore, the material for the embedding part can be chosen in a way expedient for the intended localized working, differing from the material of the foam material that surrounds the working region.

According to one particular embodiment, the incorporation of the fibrous sheet-like material comprises the covering of an outer surface of the embedding part with the fibrous sheet-like material, to be precise before the insertion of the embedding part. This is advantageous, since the soft fibrous material can be draped particularly easily around the embedding part when the latter is still outside the working region. According to an alternative embodiment, an inner surface of the working region is covered with the fibrous sheet-like material before the insertion of the embedding part, for example if this procedure is easier, depending on the form of the working region. The two embodiments can also be combined.

According to one particular embodiment, the strut is introduced by first creating a hole in the foam material, extending from a point at the entry surface of the foam material, outside the working region, to at least the fibrous sheet-like material. Subsequently, at least one bundle of fibers is drawn into the hole. This has the advantage that a particularly lightweight strut can be formed in this way. Also, it is possible to provide a step of filling the hole penetrated by the at least one bundle or fibers with a matrix system, which further reinforces the strut and improves its connection at the end points. This filling may be performed, for example, together with the infiltration of the fibrous sheet-like material.

The hole may be created by a needle being stuck through the foam material and the fibrous sheet-like material as far as an exit surface of the foam material. This has the advantage that the strut can be formed in the same way as other struts in the foam material outside the working region. Consequently, the entire foam material can be rapidly provided with struts by prior-art methods without regard to the presence or the position of the working region.

According to one particular embodiment, after the introduction of the strut, a step of at least partially removing the foam material including the strut within the working region is also provided. In this way the working region may serve, for example, as a through-hole for lines. An insert part, which can undertake further functions such as that of a fastening element, may be inserted into the working region. The diameter of the insert part is preferably at least ⅔ of the diameter of the working region and at most less than the diameter of the working region. In this region there remains an intermediate space of expedient size, which can be filled with a filling material, such as for example expansion adhesive, for the stable integration of the insert part.

According to one particular embodiment, before the removal of the foam material including the strut, at least one outer layer, in which an outer layer opening is created over the working region, for example by drilling, is also formed or arranged on at least one surface of the foam material. The diameter of the outer layer opening is preferably at least ⅔ of the diameter of the working region and at most less than the diameter of the working region. In this way, an insert part can be fitted exactly into the outer layer opening, while the working region lying under it can be filled with a filling material for the connection of the insert part.

According to one particular embodiment of the sandwich component according to the invention, the working region is filled with the foam material. Since the properties of such a sandwich component in the working region scarcely differ from the properties outside the working region, it is possible, for example, for working regions of this type to be formed as a precaution in a sandwich component, so that it can be decided at a later point in time, even after installation of the sandwich component, whether the working region is actually to be worked.

According to one particular embodiment, at least one surface of the foam core is formed by an outer layer, which completely covers over the working region in particular. In this way, the working region cannot be seen from above the outer layer, so that such working regions can be prepared for possible later working in a sandwich component without impairing the outer appearance of the sandwich component, for example in wall covering.

According to one particular embodiment, an outer layer opening is formed in the outer layer within the working region, the diameter of the outer layer opening being in particular at least ⅔ of the diameter of the working region and at most less than the diameter of the working region. An insert part may be inserted in the foam material within the working region, the diameter of the insert part being approximately equal to the diameter of the outer layer opening. In this way, the insert part is held in the outer layer opening. The insert part may perform any desired functions. According to one particular embodiment, it comprises a fastening element for fastening the sandwich component to any desired further components, for example a screw nut.

The working region may be substantially filled with a filling material, in which the insert part is integrated, the insert part having in particular a lateral depression profile, which is at least partially filled by the filling material. This leads to particularly secure anchorage and to a weight saving. The filling material may comprise an adhesive, in particular an expansion adhesive, by which the insert part and the fibrous sheet-like material are bonded to each other.

BRIEF DESCRIPTION OF THE DRAWINGS

The invention is explained in more detail below on the basis of exemplary embodiments with reference to the accompanying figures of the drawing, in which:

FIG. 2A-D shows a representation in schematic cross-sectional views of the reinforcement and localized working of a foam material according to one embodiment of the present invention.

In the figures, the same reference numerals denote identical or functionally identical components, as long as nothing contrary is specified.

DETAILED DESCRIPTION OF THE INVENTION

Figure 1:
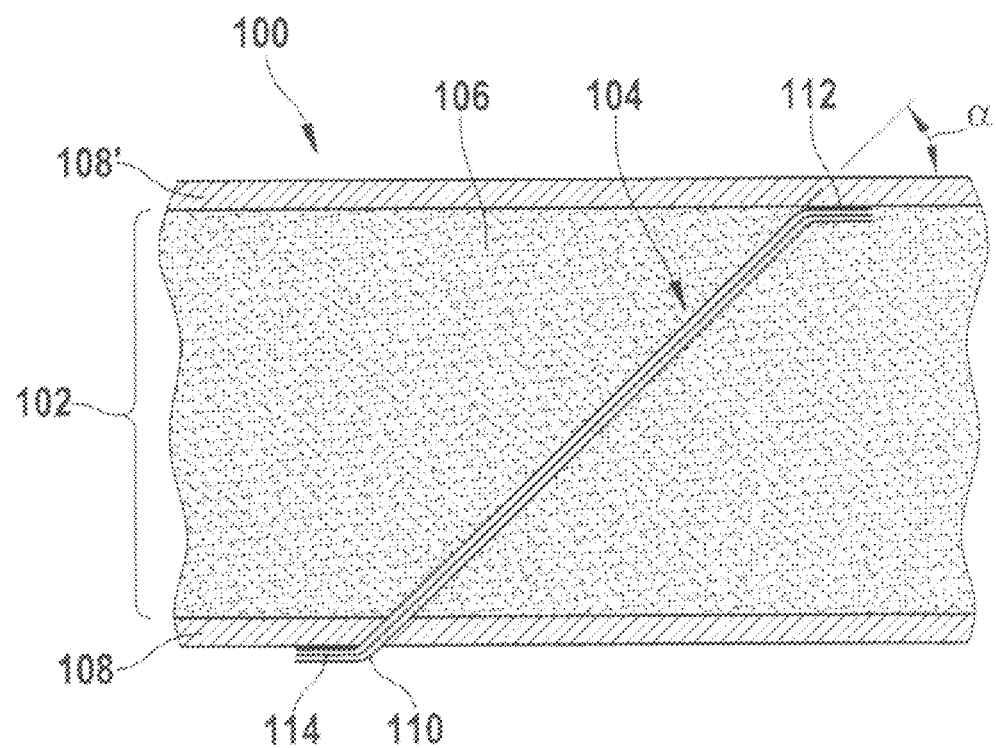
FIG. 1 shows a schematic sectional view of a sandwich structure, given by way of example, with a reinforced foam core.

FIG. 1 shows as a detail, in a schematic sectional view, an example of a sandwich component 100, which comprises a core structure 102 enclosed between two outer layers 108, 108'. The core structure 102 substantially comprises a foam material 106, for example a high-grade PMI rigid foam, as advantageously used in aviation. It goes without saying, however, that other foam materials, consisting for example of polytetrafluoroethylene or polyurethanes, may also be used.

The foam material 106 used in the core structure 102 is reinforced by a multiplicity of struts 104, which run through the foam material 106 between the two outer layers 108, 108' and of which a single strut 104 is shown here by way of example.

To form the strut 104, a through-hole has been introduced into the foam core 102 by means of a sewing method and a bundle of fibers 110 has been incorporated in it. Subsequently, the through-hole is infiltrated with resin (not shown).

The strut 104 is placed at both its ends 112, 114 against in each case one of the outer layers 108, 108' and fastened, for example in the course of infiltration with resin. By way of example, one of the ends 112 shows that the bundle of fibers can be embedded between outer layer 108' and foam material, while the other end 114 shows that the bundle of fibers 110 can be placed against the outer side of an outer layer 108. Further fastening variants are possible.

The strut 104 forms, by way of example, an angle α with the outer layers 108, 108'. The fastening of both ends 112 and 114 of the strut 104 has the effect that, under corresponding bending of the sandwich structure 100, the strut 114 is subjected to tensile loading. A multiplicity of similar struts, which under differing loading of the sandwich structure are respectively subjected to tensile loading, may have been introduced into the foam material at any desired angular position.

FIG. 2A-D shows in schematic cross-sectional views the reinforcement and further working of a foam material 106 according to one embodiment of the present invention.

The foam material 106 that is shown in the initial state in FIG. 2A is a semifinished product of the thickness s, which is stretched out in a sheet-like manner and delimited by two surfaces 210, 212 and of which the cross-sectional view of a detail can be seen here. In a first working step, symbolized by the arrow 204, the foam material 106 is removed by drilling or milling out within a working region 200 indicated by dashed lines. In the exemplary embodiment shown, this working region has the form of a cylinder with a diameter d1 and a height s. Both the foam material 106 and the working region 200 may, however, be of any other desired form and size.

FIG. 2B shows the foam material 106 with the cylindrical working region 200 hollowed out by the drilling operation 204. Additionally provided is an embedding part 208, which likewise consists of a foam material and has the form of a cylinder with a height s and a diameter which is less than the diameter d1 of the working region 200 by a small differential value. The foam material of the embedding part may be of a different type or of the same type as the foam material 106 surrounding the working region. The embedding part 208 is enclosed by a fibrous sheet-like material 202, the thickness of which is approximately half the difference between the diameter of the embedding part and the diameter d1 of the working region, so that the diameter of the embedding part 208, including the enclosure 202 of fibrous sheet-like material 202, is approximately equal to the diameter of the working region 200. The embedding part 208 is then pushed into the working region 200 with an exact fit, so that the fibrous material comes to lie in a gap between the embedding part 208 and the surrounding foam material 106.

Subsequently, a reinforcement of the foam material 106, including the working region filled by the embedding part 208, is carried out by prior-art methods, such as, for example, the method explained on the basis of FIG. 1, the result of which is represented in FIG. 2C. A series of incorporated struts 104 extend at different angles through the foam material 106, including the pushed-in embedding part 208 and its enclosure 202. This can be achieved, for example, by applying the method described on the basis of FIG. 1, since both the foam material 106 inside and outside the working region 200 and the fibrous material 202 can be pierced by needles. As already mentioned for the method from FIG. 1, through-holes are produced, with incorporated bundles of fibers that are subsequently integrated with a resin, for example by resin being forced into the through-holes from one side of the foam material. In the case of the method represented here, the fibrous sheet-like material 202 is infiltrated at the same time as the bundles of fibers, so that such struts 104 that pass through the fibrous sheet-like material 202 undergo firm connection by the resin at the location where they pass through.

Outer layers 216, 216', which may, for example, likewise consist of a fibrous sheet-like material such as, for example, a paper, which is subsequently impregnated with resin, are then arranged on the surfaces 210, 212. The struts 104 are also thereby firmly connected to the outer layers 216, 216'. In the state of the core structure 100 that is produced in this way, the working region 200 cannot be seen from the outside.

As indicated by the arrow symbol 206 in FIG. 2C, a cylindrical decored region 224 is then hollowed out within the working region 200 by drilling, removing outer layers 216, 216', foam material of the embedding part 208 and struts 104 alike. As a result, remains of struts that are left within the working region 200 become mechanically ineffectual, while the portions of the same struts 104 that lie outside remain effective on account of their connection to the fibrous sheet-like material 202. The diameter d2 of the decored region 224 is approximately ⅔ of the diameter d1 of the working region.

As can be seen in the result in FIG. 2D, the foam material of the embedding part 208 that is still left within the working region and the remains of the portions of the struts 104 that are left running within the working region 200 are then removed, for example by milling out the working region through the outer layer opening. This produces an undercut.

Subsequently, an insert part 214 with an outside diameter d2, which corresponds to the diameter of the outer layer opening formed by drilling 206, is inserted into the working region 200. In a final step, an adhesive 222, for example an expansion adhesive, is injected into the working region 200 and, when it cures, firmly bonds the insert part 214 to the sandwich structure 100. The undercut of the outer layer opening and a depth profile 220 that is formed on the insert part 214 have the effect that the insert part and the fastening element 218 that is formed on it, for example, are also held in their position with a form fit by the cured adhesive.

Although the present invention has been described in the present case on the basis of preferred exemplary embodiments, it is not restricted to these but can be modified in various ways.

For example, an insert part integrated into the working region, for performing any desired functions, may be formed as a lead-through bushing, sensor, switch, etc. The working region and the sandwich structure may altogether be of any desired geometrical form. For example, if a sensor is installed, the working region may be completely closed by the outer layer. Instead of the described struts comprising impregnated bundles of fibers, pultruded plastic rods may be used.

What is claimed is:

1. A method for reinforcing a foam material with the following method steps:
   prescribing a working region manufactured from a foam material;
   creating a gap, at least partially enclosing the working region in a two-dimensional manner;
   incorporating a fibrous sheet-like material in the gap in the foam material;
   introducing a strut into the foam material, extending from an entry surface of the foam material from outside the working region to at least the fibrous sheet-like material; and
   infiltrating the fibrous sheet-like material with a matrix system.

2. The method according to claim 1, wherein the gap penetrated by the fibrous sheet-like material is filled with the matrix system.

3. The method according to claim 1, wherein the creation of the gap comprises the following sub-steps:
   removing the foam material in the working region;
   preparing an embedding part, which is formed in a way corresponding to the working region such that it substantially fills it while leaving the gap; and
   inserting the embedding part into the working region.

4. The method according to claim 3, wherein the incorporation of the fibrous sheet-like material comprises the covering of an outer surface of the embedding part with the fibrous sheet-like material before the insertion of the embedding part.

5. The method according to claim 3, wherein the incorporation of the fibrous sheet-like material comprises the covering of an inner surface of the working region with the fibrous sheet-like material before the insertion of the embedding part.

6. The method according to claim 1, wherein the introduction of the strut comprises the following sub-steps:
   creating a hole in the foam material, extending from the entry surface of the foam material from outside the working region to at least the fibrous sheet-like material; and
   drawing at least one bundle of fibers into the hole.

7. The method according to claim 6, wherein a step of filling the hole penetrated by the at least one bundle of fibers with the matrix system is also provided.

8. The method according to claim 6, wherein the creation of the hole is performed by sticking a needle through the foam material and the fibrous sheet-like material as far as an exit surface of the foam material.

9. The method according to claim 1, wherein, after the introduction of the strut, a step of at least partially removing the foam material including the strut within the working region is performed.

10. The method according to claim 9, further comprising a step of inserting an insert part into the working region, the diameter of the insert part being at least ⅔ of the diameter of the working region and at most less than the diameter of the working region.

11. The method according to claim 10, wherein, before the step of removing the foam material (106) including the strut, the following steps are also performed:
    forming or arranging at least one outer layer on at least one surface of the foam material; and
    creating an outer layer opening in the at least one outer layer over the working region,
    the diameter of the outer layer opening being at least ⅔ of the diameter (d2) of the working region and at most less than the diameter (d1) of the working region.

* * * * *